Patented Apr. 1, 1924.

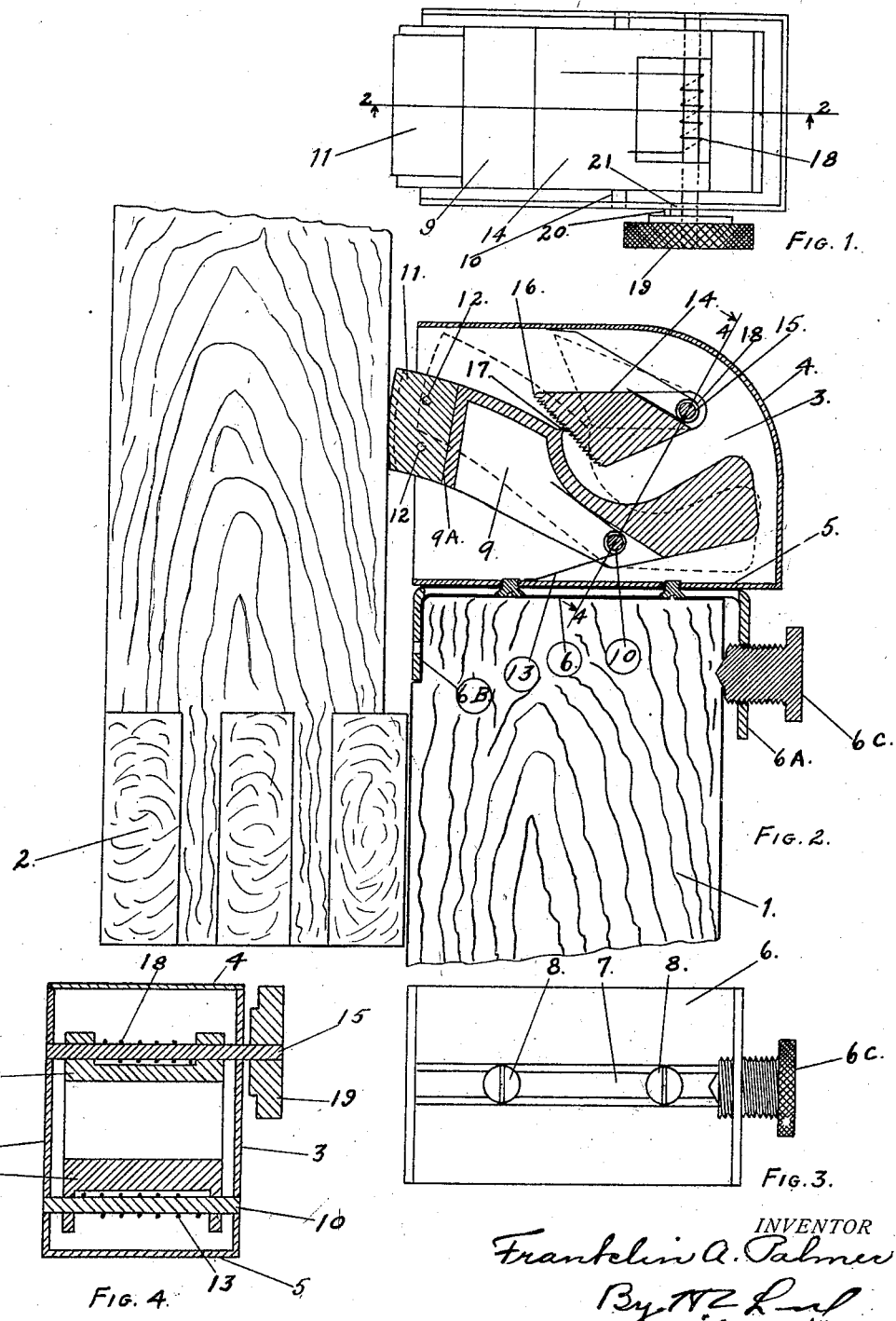

1,488,706

UNITED STATES PATENT OFFICE.

FRANKLIN A. PALMER, OF ERIE, PENNSYLVANIA.

WINDOW LATCH.

Application filed April 22, 1920. Serial No. 375,717.

*To all whom it may concern:*

Be it known that I, FRANKLIN A. PALMER, a citizen of the United States, residing at Erie, in the county of Erie and State of Pennsylvania, have invented new and useful Improvements in a Window Latch, of which the following is a specification.

The purpose of this invention is to provide a window latch which may be readily applied to the common sliding windows and afford an efficient lock which will operate at any point in the window and prevent a further opening of either the upper or lower sash.

In carrying out the invention it is desirable to have the latch so formed that it cannot be disengaged from the outside, in other words, may be firmly locked against any tampering from without the window. Features of the invention relating to details will appear more fully from the specification and claims.

The invention is illustrated in the accompanying drawings as follows:—

Fig. 1 shows a plan view of the device with the top of the frame removed.

Fig. 2 a section on the line 2—2 in Fig. 1.

Fig. 3 a bottom view of the device.

Fig. 4 a section on the line 4—4 in Fig. 2.

1 marks the lower sash of a window, 2 the upper sash, 3 the side walls of an enclosing frame, 4 a connecting top and rear web, and 5 a bottom web completing the frame. The frame as it will be observed forms a pocket open at the front.

An attaching plate 6 is provided with a slot 7 extending across the upper face and is secured to the main frame 3 by means of screws 8. The plate has the flanges 6$^a$ and 6$^b$ and a screw 6$^c$ extends through the flange 6$^a$ by means of which it may be clamped to the top edge of a window sash. The slot 7 permits of the frame being moved along the plate 6 so as to adjust the frame relatively to the front face of the upper sash so that the locking devices may work properly with relation to such sash.

A locking dog 9 is mounted in the frame by means of a pin 10 which extends across from one wall 3 to the other. The dog is provided with a rubber face 11 which is set in a socket 9$^a$ in the dog 9 and secured in place therein in any desirable manner preferably by pins 12. It will readily be seen that as this dog swings downwardly it protrudes from the frame and if brought into engagement with the upper sash will prevent an upward movement of the lower sash or a downward movement of the upper sash because of any such relative movement tends to increase the protrusion and consequently will so separate the sashes and force them against their stops as to prevent any movement.

In order to lock the dog 9 so that it cannot be forced upwardly and consequently disengaged by a thin instrument from the outside I provide a dog 14. This dog is pivotally mounted on a pin 15 which extends from one wall 3 to the other. The dog has the serrations 16 on its face which engage a serration 17 on the dog 9 so as to make the engagement between the dog 14 and the dog 9 more secure so as to prevent a retraction of the dog 9 by pressure on the dog 9. A spring 18 is coiled around the pin 15 and engages the dog 14 and the wall 4 and tends to thrust the dog 14 downwardly into engagement. A spring 13 is coiled around the pin 10 and operates against the dog 9 and the bottom 5 and tends to retract the dog 9.

The pin 15 is fixed on the dog 14 and extends to without the wall 3 and is provided with a nurled handle 19 by means of which the dog 14 may be retracted when it is desired to release the dog 9. By retracting the dog 14 against the spring 18 the spring 13 is permitted to accomplish the retraction of the dog 9. If the dog 9 tends to stick in engagement a slight movement of the sash will release it.

In order to lock the dog 14 in retracted position I provide a pin 20 on the handle 19 which when the handle is moved to bring the dog to retracted position comes into register with a perforation 21 in the wall 3. By moving the handle inwardly the pin 20 is moved into the perforation 21, the devices locking the dog in its upper or retracted position. The dog 14 is of slightly less width than the frame so as to permit an axial movement of the pin 15 sufficient to carry the pin into and out of the perforation 21.

What I claim as new is:—

1. In a window latch, the combination of a frame; a latching dog pivotally mounted and housed in the frame and protruding therefrom, the protrusion being increased by the swinging of the dog and adapted to engage a plane surface; a setting dog operating on the latching dog to move it to and secure it in locking position at various points extending to the point of greatest protrusion; a handle for the setting dog extending to without the frame; a spring retracting the latching dog; and a spring acting on the setting dog and tending to force it into engagement with the locking dog.

2. In a window latch, the combination of a frame; a latching dog pivotally mounted and housed in the frame and protruding therefrom, the protrusion being increased by the swinging of the dog; a setting dog operating on the latching dog to secure it in latching position at the point of greatest protrusion; a handle for the setting dog extending to without the frame; a spring retracting the latching dog; and a spring acting on the setting dog and tending to force it into engagement with the latching dog, the spring on the setting dog being of greater strength than the spring on the latching dog.

3. In a window latch, the combination of a frame; a latching dog pivotally mounted and housed in the frame and protruding therefrom, the protrusion being increased by the swinging of the dog and adapted to engage a plane surface; a setting dog operating on the latching dog to secure it in latching position at various points extending to the point of greatest protrusion; a handle for the setting dog extending to without the frame; a spring retracting the latching dog; and means for securing the setting dog in retracted position.

4. In a window latch, the combination of a frame in the form of a housing; a latching dog pivotally mounted in the frame and housed thereby and protruding therefrom as it is swung, the protrusion being increased by the swinging of the dog; a spring tending to retract the latching dog; a setting dog mounted in the frame and acting on the latching dog; a spring acting on the setting dog, said spring being of greater strength than the spring on the latching dog; a pin on which the setting dog is mounted extending without the frame; said dog being moved by a turning movement of the pin; a handle on the pin; and latching means between the handle and frame for latching the setting dog in retracted position.

5. In a window latch, the combination of a frame; a latching device carried by the frame, the latching device having a protruding swinging means, said protuberance increasing as the means swings and adapted to engage an adjacent plane surface; a clamp for securing the frame on the edge of a window sash; and means for adjusting the frame on the clamp.

In testimony whereof I have hereunto set my hand.

FRANKLIN A. PALMER.